United States Patent
Fukaya et al.

(10) Patent No.: US 9,003,446 B2
(45) Date of Patent: Apr. 7, 2015

(54) DISPLAY SCREEN CHANGEOVER APPARATUS, DISPLAY SCREEN CHANGEOVER METHOD, DISPLAY SCREEN CHANGEOVER PROGRAM AND COMPUTER READABLE RECORDING MEDIUM STORING A DISPLAY SCREEN CHANGEOVER PROGRAM

(75) Inventors: Masao Fukaya, Tokyo (JP); Junichi Ando, Tokyo (JP); Minoru Kataoka, Tokyo (JP); Hirokatsu Miyamoto, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 13/238,720

(22) Filed: Sep. 21, 2011

(65) Prior Publication Data

US 2012/0081603 A1    Apr. 5, 2012

(30) Foreign Application Priority Data

Oct. 1, 2010   (JP) .................. 2010-224402

(51) Int. Cl.
| | |
|---|---|
| G06F 3/00 | (2006.01) |
| G06F 13/00 | (2006.01) |
| H04N 5/445 | (2011.01) |
| H04N 21/435 | (2011.01) |
| G06F 17/30 | (2006.01) |
| H04N 21/4782 | (2011.01) |
| H04N 21/858 | (2011.01) |
| H04N 21/235 | (2011.01) |

(52) U.S. Cl.
CPC ...... *H04N 21/4355* (2013.01); *G06F 17/30899* (2013.01); *H04N 21/2355* (2013.01); *H04N 21/2356* (2013.01); *H04N 21/4356* (2013.01); *H04N 21/4782* (2013.01); *H04N 21/8586* (2013.01)

(58) Field of Classification Search
USPC ...................................... 725/37–61
See application file for complete search history.

(56) References Cited

U.S. PATENT DOCUMENTS

| | | | |
|---|---|---|---|
| 6,177,931 B1 * | 1/2001 | Alexander et al. ............ 725/52 |
| 6,240,555 B1 * | 5/2001 | Shoff et al. .................. 725/110 |
| 6,836,786 B1 | 12/2004 | Zoller et al. |
| 7,212,218 B2 * | 5/2007 | Suzuki et al. ............... 345/660 |
| 7,725,530 B2 * | 5/2010 | Sah et al. .................... 709/203 |
| 2003/0145338 A1 * | 7/2003 | Harrington ................. 725/136 |

(Continued)

FOREIGN PATENT DOCUMENTS

| | | |
|---|---|---|
| GB | 2339374 | 1/2000 |
| JP | 2004-186803 | 7/2004 |

(Continued)

OTHER PUBLICATIONS

Extended European Search Report mailed Feb. 1, 2012.

(Continued)

*Primary Examiner* — Mushfikh Alam
(74) *Attorney, Agent, or Firm* — IPUSA, PLLC

(57) ABSTRACT

A display screen changeover apparatus changes a screen display when displaying HTML contents on a display screen of a television receiver. A contents analysis part analyzes display setting information with respect to the television receiver based on address information given to the HTML contents. A display setting part sets a display of the HTML contents with respect to the display screen based on a result of analysis obtained by the contents analysis part.

9 Claims, 9 Drawing Sheets

(56) References Cited

U.S. PATENT DOCUMENTS

| | | | |
|---|---|---|---|
| 2003/0146930 A1* | 8/2003 | Schelvis et al. | 345/738 |
| 2004/0051812 A1* | 3/2004 | Hayward | 348/460 |
| 2005/0041858 A1 | 2/2005 | Celi, Jr. et al. | |
| 2005/0105528 A1* | 5/2005 | Kobayashi | 370/390 |
| 2005/0114367 A1* | 5/2005 | Serebrennikov | 707/100 |
| 2005/0131930 A1* | 6/2005 | Jang et al. | 707/101 |
| 2005/0138137 A1 | 6/2005 | Encarnacion et al. | |
| 2005/0166257 A1* | 7/2005 | Feinleib et al. | 725/136 |
| 2005/0262104 A1* | 11/2005 | Robertson et al. | 707/10 |
| 2006/0015813 A1* | 1/2006 | Chung et al. | 715/542 |
| 2008/0301277 A1* | 12/2008 | Tsujiguchi | 709/223 |
| 2010/0071015 A1* | 3/2010 | Tomioka et al. | 725/110 |
| 2010/0119212 A1* | 5/2010 | Yoon et al. | 386/95 |
| 2011/0075164 A1* | 3/2011 | Nordback | 358/1.9 |
| 2011/0125587 A1* | 5/2011 | Netzer et al. | 705/14.68 |
| 2011/0231782 A1* | 9/2011 | Rohrabaugh et al. | 715/760 |
| 2011/0252302 A1* | 10/2011 | Yalovsky | 715/234 |
| 2013/0019274 A1* | 1/2013 | Basso et al. | 725/106 |
| 2014/0195523 A1* | 7/2014 | Larsson et al. | 707/722 |

FOREIGN PATENT DOCUMENTS

| | | |
|---|---|---|
| JP | 2007-060676 | 3/2007 |
| JP | 2010-008933 | 1/2010 |
| WO | WO2004/051430 | 6/2004 |
| WO | WO2007/063617 | 6/2007 |

OTHER PUBLICATIONS

YouTube Team: "YouTube Release Notes Mar. 26, 2009", Feb. 26, 2009, XP002667553, Retrieved from the Internet : URL:http://youtube-global.blogspot.com/2009/03/release-notes-3262009.html [retrieved on Jan. 12, 2012].

Japanese Office Action dated May 20, 2014.

European Office Action dated Sep. 3, 2014.

* cited by examiner

FIG.5A

SD DISPLAY SETTING=「SD=1」
HD DISPLAY SETTING=「SD=0」,「HD=1」

FIG.5B (1) http://www.testtest.com/
(2) http://www.test-sd.com/
...

FIG.5C

REDUCTION MAGNIFICATION SETTING=90%

FIG.6A

| | |
|---|---|
| http://www.test.com/index.html?SD=1 | → SD DISPLAY |
| http://www.test.com/index.html?SD=0 | → HD DISPLAY |
| http://www.test.com/index.html | → REDUCTION HD DISPLAY |
| http://www.test.com/index.html?stbid=12345&SD=1 | → SD DISPLAY |
| http://www.test.com/index.html?stbid=12345&SD=0 | → HD DISPLAY |
| http://www.test.com/index.html?stbid=12345 | → REDUCTION HD DISPLAY |
| http://www.test.com/index.html?SD=2 | → REDUCTION HD DISPLAY |
| http://www.test.com/index.html?SD=10 | → REDUCTION HD DISPLAY |
| ... | |

FIG.6B

| | |
|---|---|
| http://www.test-sd.com/index.html | → SD DISPLAY |
| http://www.test.com/index.html | → REDUCTION HD DISPLAY |
| ... | |

FIG.6C

| URL | Display |
|---|---|
| http://www.test-sd.com/index.html?SD=1 | → SD DISPLAY |
| http://www.test-sd.com/index.html?stbid=12345&SD=1 | → SD DISPLAY |
| http://www.test-sd.com/index.html?SD=0 | → HD DISPLAY |
| http://www.test-sd.com/index.html?stbid=12345&SD=0 | → HD DISPLAY |
| http://www.test-sd.com/index.html | → SD DISPLAY |
| http://www.test.com/index.html?SD=1 | → SD DISPLAY |
| http://www.test.com/index.html?stbid=12345&SD=1 | → SD DISPLAY |
| http://www.test.com/index.html?SD=0 | → HD DISPLAY |
| http://www.test.com/index.html?stbid=12345&SD=0 | → HD DISPLAY |
| http://www.test.com/index.html | → REDUCTION HD DISPLAY |
| ... | |

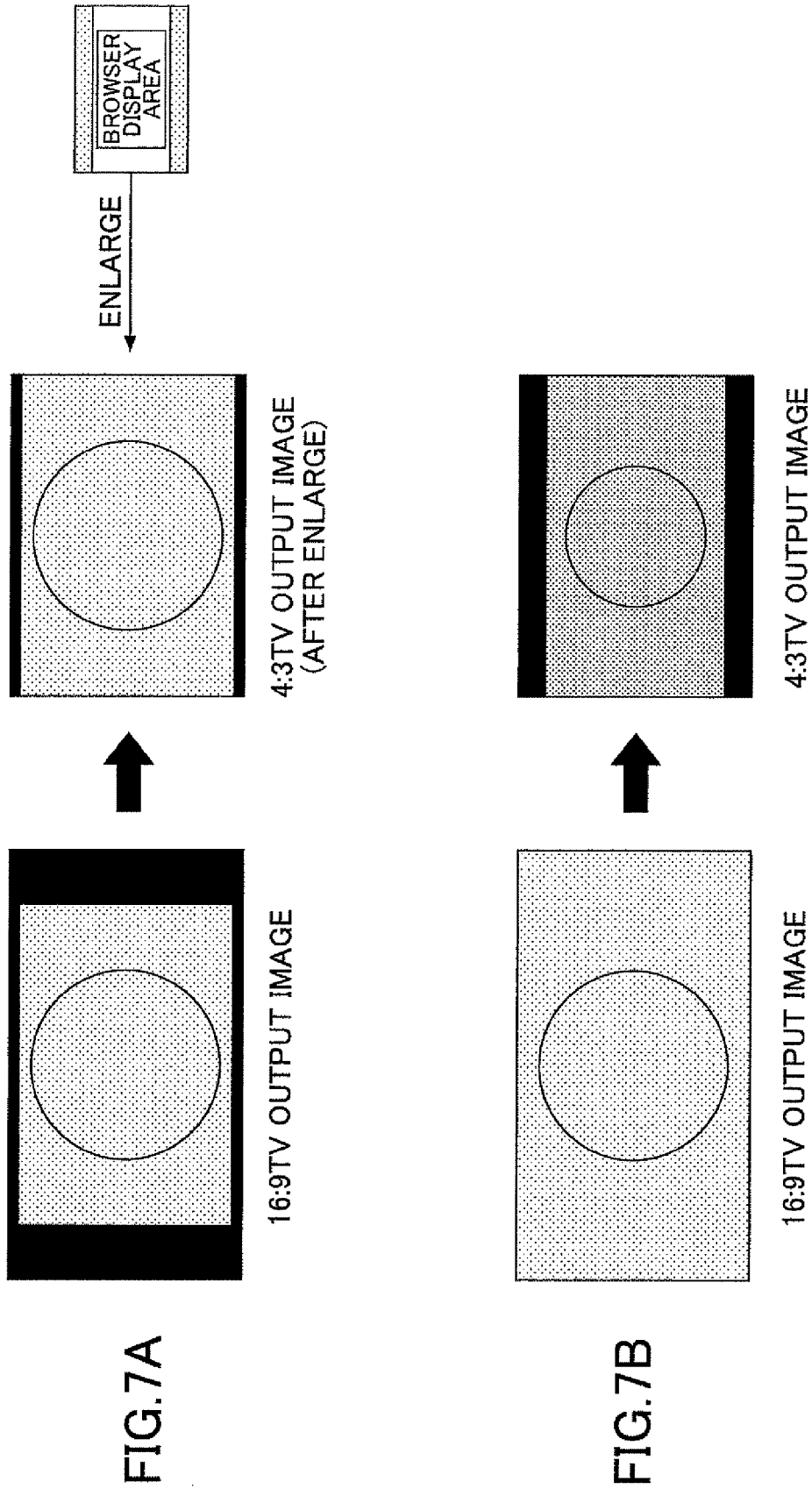

DISPLAY SCREEN CHANGEOVER APPARATUS, DISPLAY SCREEN CHANGEOVER METHOD, DISPLAY SCREEN CHANGEOVER PROGRAM AND COMPUTER READABLE RECORDING MEDIUM STORING A DISPLAY SCREEN CHANGEOVER PROGRAM

BACKGROUND OF THE INVENTION

1. Field of the Invention

The present invention relates to a display screen changeover technique to quickly and easily perform a changeover of content display on a TV screen.

2. Description of the Related Art

Conventionally, there is a television receiver (hereinafter, referred to as TV) that receives broadcast signals transmitted via radio frequencies by an antenna or the like, and provides to viewing audience a preferred program selected by a tuner by displaying the program on a screen. A conventional TV displays a screen according to a format specified by a standard definition television (SDTV) or a format specified by a high definition television (HDTV). Here, the aspect ratio used in SDTV is different from the aspect ratio used in HDTV. Japanese Laid-Open Patent Applications No. 2004-186803 and No. 2007-60676 discloses a technique to convert a program according to an aspect ratio contained in broadcast signals into a program according to a previously set aspect ratio used in a display screen, and display the converted program on a display screen.

In recent years, in order to provide to viewing audience various kinds of information such as program related information, whether information, news information, etc., together with broadcast programs, there is provided data broadcast service such as cable television broadcast, digital broadcast, Internet protocol (IP) broadcast, etc. In this case, for example, signals sent from the above-mentioned various kinds of broadcast are converted into viewable data to be displayed on a TV screen. It should be noted that STB is provided with functions of demodulating or decoding each broadcast data, cancelling scramble, controlling limited reception, displaying electronic program guide (EPG), etc.

Furthermore, the conventional STB has a function of displaying on a TV screen a hyper text markup language (HTML) content such as a Web page (HTML page) acquired from an external server through, for example, the Internet.

According to the service using HTML contents, such as a HTML page supposing TV display, the aspect ratio of the HTML page is set to 4:3 (SD) or 16:9 (HD) so that HTML page can be displayed without scrolling by the display terminal.

It is usual for the service to display HTML pages on a TV to fix the size of the HTML page to an SD size or an HD size. Therefore, the display terminal merely has one browser display corresponding to either the SD size or the HD size.

However, in the service using both the HTML page of HD size and the HTML page of SD size, if a display is made with the fixed browser size, various problems may occur. For example, if an HTML page of SD size is displayed on the browser of HD size, the HTML page is displayed by left-aligned. Additionally, if a browser of HD size is displayed on 4:3 TV, it becomes a letter box display.

Because the HTML page of SD size is displayed in this letter box display, the HTML page displayed becomes small with respect to an area displayed by the TV. Moreover, if an HTML page of HD size is displayed on the browser of SD size, the entire HTML page does not fall within a display area of the browser, and it is necessary to scroll the screen when viewing the HTML page.

With such a service, it is assumed that a general HTML page is used other than that specified in the service. However, in a general site, because a page structure is not set in consideration with TV's over-scanning, the browser display may run off a TV display frame, which may result in that a part of the page cannot be displayed. Accordingly, in many cases, even if it is over-scanned on the TV side, a display is made by scaling the size to be smaller than an actual size so that the entire page can be displayed.

Moreover, when displaying on a TV screen, a display according to a format which a contents provider side desires to display cannot be displayed because the display is made in a state where a user previously sets by STB or the like.

SUMMARY OF THE INVENTION

It is a general object of the present invention to provide a display screen changeover apparatus, a display screen changeover method and a display screen changeover program in which the above-mentioned problems are eliminated.

A more specific object of the present invention is to provide a display screen changeover apparatus, a display screen changeover method and a display screen changeover program which can quickly and easily perform a changeover of a contents display on a TV screen.

There is provided according to one aspect of the present invention a display screen changeover apparatus changing a screen display when displaying HTML contents on a display screen of a television receiver, comprising: a contents analysis part configured to analyze display setting information with respect to the television receiver based on address information given to the HTML contents; and a display setting part configured to set a display of said HTML contents with respect to the display screen based on a result of analysis obtained by the contents analysis part.

There is provided according to another aspect of the present invention a display screen changeover method of changing a screen display when displaying HTML contents on a display screen of a television receiver, comprising: a contents analysis step of analyzing display setting information with respect to the television receiver based on address information given to the HTML contents; and a display setting step of setting a display of said HTML contents with respect to the display screen based on a result of analysis obtained by the contents analysis step.

Additionally, there is provided a computer readable program causing a computer to perform the above-mentioned display screen changeover method. Further, there is provided a computer readable recording medium storing a program causing a computer to perform the above-mentioned display screen changeover method.

Other objects, features and advantages of the present invention will become more apparent from the following detailed description when read in conjunction with the accompanying drawings.

BRIEF DESCRIPTION OF THE DRAWINGS

FIGS. 5A, 5B and 5C are illustrations of various kinds of basic information;

FIGS. 6A, 6B and 6C are illustrations indicating address information, which is an object of a contents interpretation process; and FIGS. 7A, 7B and 7C are illustrations indicating display examples on a TV screen.

DETAILED DESCRIPTION OF THE PREFERRED EMBODIMENTS

A description will be given below, with reference to the drawings, of an embodiment according to the present invention.

According to an embodiment of the present invention, a piece of information, such as an aspect ratio of an HTML page (Web page) itself or a page displayed next is embedded in HTML contents. On a receiver side, the embedded information is acquired from the HTML page, and a size of a browser to display is adjusted according to the acquired information. Thereby, a display matching the HTML page can be made. Additionally, according to an embodiment of the present invention, a display efficiently using a TV display area is made by using aspect information of an HTML page and a TV type (4:3 or 16:9) connected presently.

According to an embodiment of the present invention, a determination can be made even when there is no information regarding an aspect ratio in the HTML page to be displayed. When there is no information concerned, a control such as a display with an HD reduction size is performed. Thus, for example, measures for a TV over-scan can be taken only when displaying an HTML page (a page does not have aspect ratio information) of a general site.

A description will be given below, with reference to the drawings, of an embodiment of a display screen changeover apparatus, a display screen changeover method and a display screen changeover program. In the embodiment mentioned below, the above-mentioned STB is used as an example of the display screen changeover apparatus. However, the present invention is not limited to this, and, for example, the present invention is applicable to an apparatus such as a television game machine which can display HTML contents on a TV screen. Further, the embodiment mentioned below is applicable to a TV provided with a function of display screen changeover apparatus.

Figure 1:
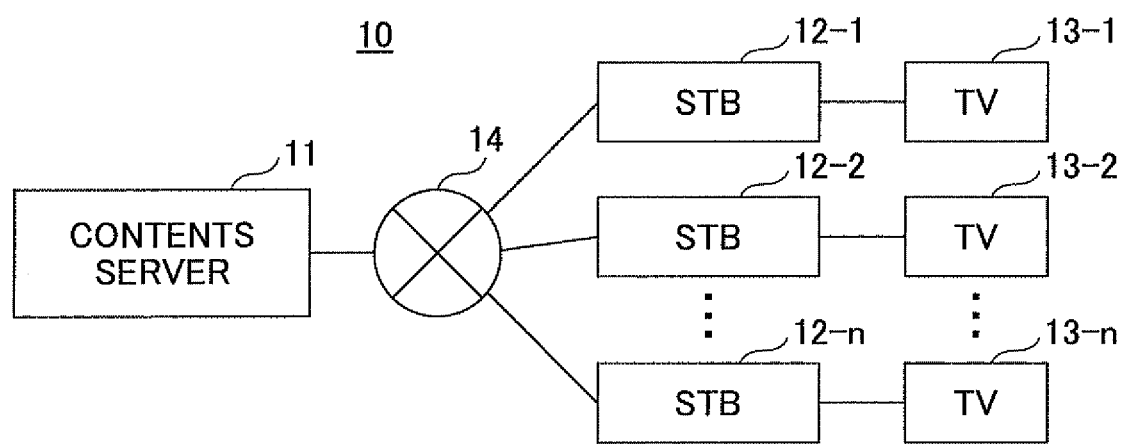
FIG. 1 is an illustration of a contents providing system according to an embodiment of the present invention.

First, a description is given of a structure of a contents providing system according to the embodiment. FIG. 1 is an illustration of a contents providing system 10 according to the embodiment. The contents providing system 10 includes a contents server 11, a plurality of STBs 12-1, 12-2, . . . , 12-n each of which serves as a display screen changeover apparatus, and a plurality of TVs 13-1, 13-2, . . . , 13-n connected to the respective STBs 12-1, 12-2, . . . , 12-n. Hereinafter, the STBs 12-1, 12-2, . . . , 12-n may be collectively referred to as STB 12, and the TVs 13-1, 13-2, . . . , 13-n may be collectively referred to as TV 13. The contents server 11 and the STB 12 are connected through a communication network 14 using Ethernet (registered trademark) protocols, such as the Internet so that transmission and reception of data can be made.

The contents server 11 is connected to the TV 13 through the STB 12 and the communication network 14. The contents server 11 provides contents, such as HTML contents provided by data broadcast, etc. The contents server 11 is a Web server to manage user information of the connected STB 12. The contents server 11 may be a broadcast station providing broadcast programs.

The contents server 11 individually manages each contents provider, and can set up what data is provided to each user using the connected STB 12.

Moreover, when performing the contents providing service such as limited reception, the contents server 11 sends data after encrypting the data to be provided. Thereby, the STB 12 decrypts the encrypted contents by a decrypt key (private key) or the like which is previously recorded, and can output the decrypted contents to the TV 13.

It should be noted that the contents server 11 is provided with various kinds of service programs for providing the contents by performing the above-mentioned process, and performs each kind of process based on the service programs.

The STB 12 as a display screen changeover apparatus sets a state of a display screen by relating HTML contents acquired from the contents server 11 to the connected TV 13, and outputs the set information to the TV 13. A specific function of the STB 12 will be described later.

The TV 13 is a display unit for displaying the contents information from the contents server on a screen. The display unit according to the present embodiment is not limited to the above-mentioned TV 13. For example, equipment having a general purpose display, such as a personal computer (PC) and a personal digital assistant (PDA) may be used as the display unit. It should be noted that the above mentioned STB 12 and TV 13 may be together incorporated into one apparatus.

Figure 2:
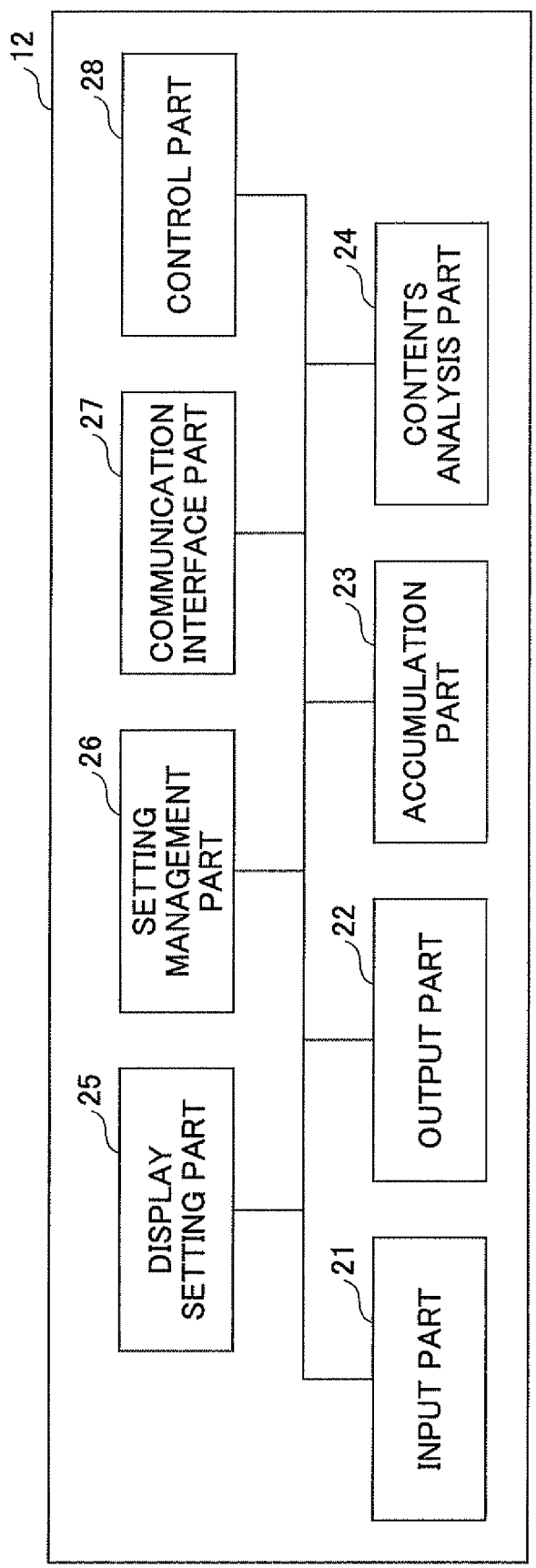
FIG. 2 is a functional block diagram of an STB illustrated in FIG. 1.

A description is given below of a functional structure of the above-mentioned STB 12. FIG. 2 is an illustration indicating a functional structure of the STB 12.

The STB 12 includes an input part 21, an output part 22, an accumulation part 23, a contents analysis part 24, a display setting part 25, a setting management part 26, a communication interface part 27, and a control part 28.

The input part 21 receives an input of start/end of various instructions such as a contents analysis instruction from a user, a display screen setting instruction, a setting management instruction, etc. The input part 21 may be an operation screen provided in the STB 12, or may be a control device such as a remote controller. If the input part 21 is a remote controller, a receiving part which receives a signal (an infrared signal) from the remote controller is provided to the STB 12.

The output part 22 performs a display and output of contents input by the input part 21 and contents performed based on the contents of input. The output part 22 includes a display, a speaker, etc.

The input part 21 and the output part 22 may be an input-and-output part of one piece type like a touch panel. In such a case, an input is performed by touching a predetermined position using a user's finger, a pen type input equipment, etc.

The accumulation part 23 accumulates analysis basic information for analyzing contents by the contents analysis part 24, information regarding a result of analysis, display basic information for setting by the display setting part 25, display screen information, and management contents information of the setting management part 26.

Moreover, the accumulation part 23 accumulates various sets of data necessary for the present embodiment, such as various programs such as an application executed in the present embodiment, display condition information based on the result of analysis, etc., and also accumulates information regarding various results acquired in the present embodiment.

The various sets of data and result information can be read from the accumulation part 23, if necessary.

The contents analysis part 24 analyzes the contents of the HTML contents obtained from the contents server 11. Specifically, the contents analysis part 24 analyzes whether a predetermined character or value indicating the display setting information is contained using a query description portion and/or a domain description portion contained in contents address information such as URL and previously set various pieces of basic information for analysis. It should be noted that the above-mentioned address information can be acquired from URL assigned to a plurality of sites obtained by a search performed on, for example, a Web page (HTML page) of a specific search site or the contents server 11 by using a search keyword input by a user through the search site.

The display setting part 25 sets display contents of a display screen based on a result of analysis by the contents analysis part 24. The display setting part 25 changes the display contents of a contents page based on the set-up contents. Specifically, the display setting part 25 changes the display contents, such as an SD display, an HD display, or a reduction HD display, based on display conditions based on analysis result set up beforehand.

The setting management part 26 manages the set-up display contents. Specifically, the setting management part 26 manages URL of set-up HTML contents so that setting can be adjusted, if necessary. That is, if the HTML contents include address information of a predetermined domain, the setting management part 26 causes the previous setting contents to be usable, or a new contents analysis to be performed.

Furthermore, the setting management part 26 also manages various kinds of setting information. The setting information includes setting contents of a screen size (pixel), setting contents of a resolution (for example, 960×540, 720×480, 640×480, etc.), setting of a contrast and volume, mode setting of SD/HD, setting of high-definition multimedia interface (HDMI), setting of I-LINK, etc., from the TV 13.

When analyzing address information of the above-mentioned HTML contents, the setting management part 26 can change any one of pieces of information mentioned above by a query analysis or a domain analysis. Thereby, a finer setup can be performed on TV.

The communication interface part 27 performs transmission and reception of data through the contents server 11 and the communication network, and also performs transmission and reception of data with respect to the TV 13 that is presently connected.

Specifically, the communication interface part 27 receives various kinds of contents, such as HTML contents, a picture, an image, music data, text data, etc., from the contents server 11. Moreover, the communication interface part 27 outputs contents to the TV 13, which contents are changed by the display setting part 25 into predetermined screen display contents with respect to the various kinds of contents received.

Moreover, the communication interface part 27 receives data acquisition request information in data broadcast instructed by the TV 13, or response information to a question displayed. Furthermore, the communication interface part 27 transmits the above-mentioned data acquisition request information, response information, etc., to the contents server 11.

The control part 28 controls the entire STB 12. Specifically, the control part 28 performs each control of a contents analysis process, a display screen setting process, a setting management process, etc., based on instructions from the input part 21 by a user or an input of HTML contents.

Figure 3:
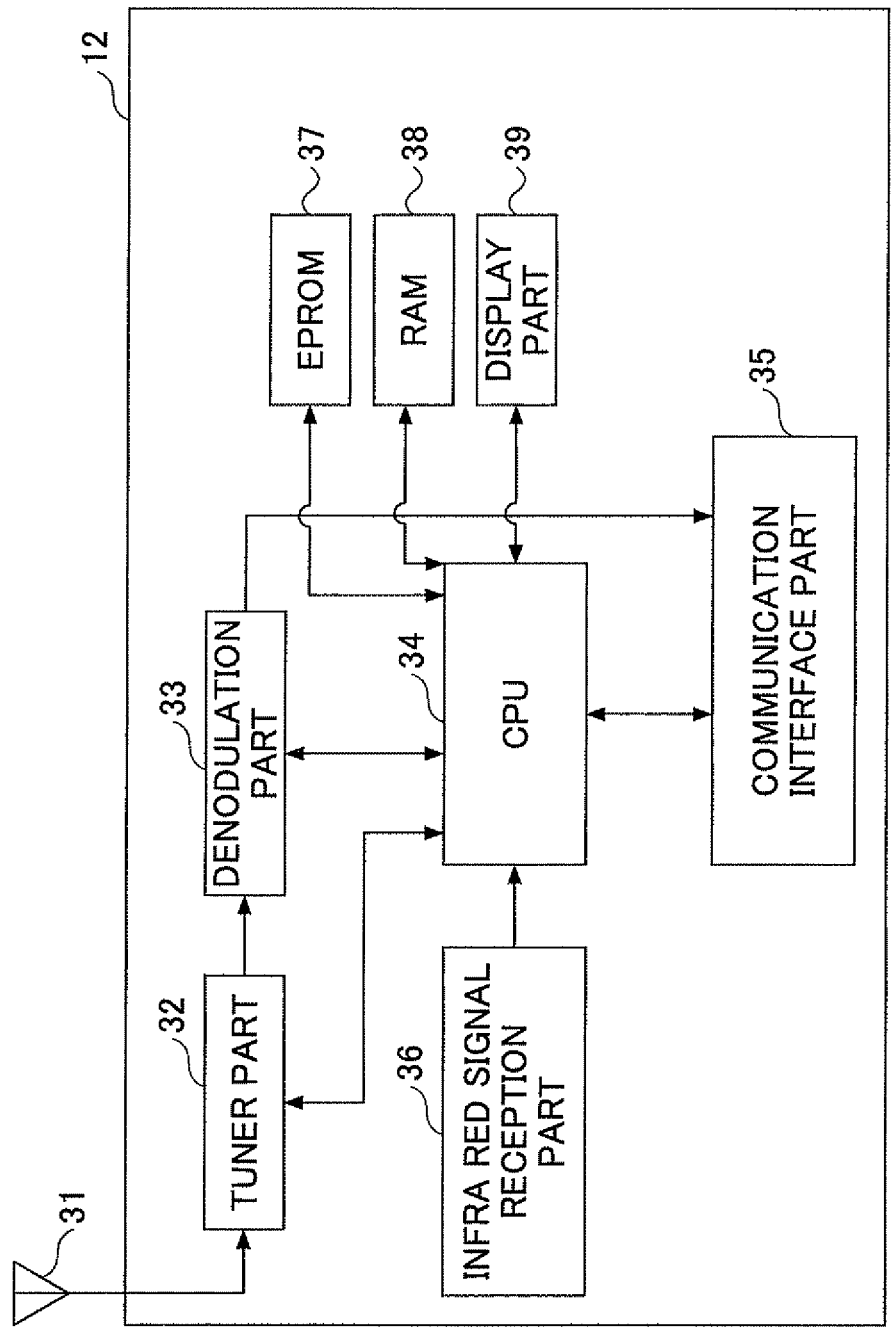
FIG. 3 is a block diagram of a hardware structure of the STB illustrated in FIG. 2.

A description is given of a hardware structure of the STB 12 in the present embodiment. FIG. 3 is a block diagram of a hardware structure of the STB 12 in the present embodiment.

The STB 12 has an antenna part 31, a tuner part 32, a demodulation part 33, a CPU 34, a communication interface part 35, an infrared signal receiving part 36, an erasable and programmable ROM 37 (EPROM), a RAM 38, and a display part 39. The EPROM 37 and the RAM 38 are accumulation parts in the STB 12.

The antenna part 31 is a broadcast signal receiving part for receiving broadcast signals transmitted by radio frequency. The antenna part 31 outputs a received signal to the tuner part 32. The tuner part 32 extracts the broadcast signal of a channel, which is selected by a user from the broadcast signal received by the antenna part 31 or previously set in the STB 12, according to a control signal from the CPU 34.

The demodulation part 33 performs a demodulation according to a broadcast system of the broadcast signal extracted by the tuner part 32 by the control signal from CPU 34. For example, when the extracted broadcast signal has been encrypted, the demodulation part 33 can perform a process of demodulating the encrypted signal by acquiring key information accumulated in the EPROM 37.

The CPU 34 is a control part which controls processing of each composition part in STB 12. Specifically, based on contents of an instruction from a user acquired by, for example, the infrared signal receiving part 36, the CPU 34 performs a process of sending a control signal for receiving a predetermined broadcast signal corresponding to the contents of the instruction to the tuner part 32 and the demodulation part 33. Additionally, the CPU 34 causes the demodulation part 33 to perform a process of extracting the predetermined signal by sending the key information acquired from the EPROM 37. The CPU 34 also performs a process of outputting the contents (programs) acquired from the demodulation part 33 to the TV 13 connected by the communication interface part 35. Further, the CPU performs a process of reading various kinds of information from the EPROM 37 or the RAM 38, if needed, and writing various kinds of information in the EPROM 37 or the RAM 38, if needed. Additionally, the CPU 34 performs a process of outputting contents of an instruction from a user acquired by the infrared signal receiving part 36. The communication interface part 35 is an interface circuit for transmitting and receiving data with other apparatuses connected through, for example, an IEEE 1394 serial bus (hereinafter, referred to as a bus). The communication interface part 35 transmits/receives data to/from the contents server 11, or transmits/receives data to/from the TV 13.

The infrared signal receiving part 36 receives an instruction signal of an infrared signal type sent from an operation part of a remote controller, and converts the instruction signal into a normal digital signal and outputs it to the CPU 34. The CPU 34 performs a control corresponding to the digital signal.

The EPROM 37 records various kinds of setting information such as MAC address and key information, as mentioned above, according to a control signal from the CPU 34. Moreover, the EPROM 37 accumulates various kinds of setting information such as setting information regarding a screen size and a resolution when outputting to the TV 13 connected to the STB 12, setting information regarding a contrast, setting information regarding large/small of a volume, mode setting information regarding an HD image/SD image, a high-definition multimedia interface (HDMI), an I-LINK, etc. Furthermore, the EPROM 37 can also store various programs required in the present embodiment.

Here, the EPROM 37 has an advantage in that a correction or specification change of programs can be made in a more flexible manner because data is rewritable as compared to a mask ROM, which data is written when manufacturing a chip, and a programmable ROM (PROM), which data is writable only once. It should be noted that the present embodiment is not limited to the EPROM 37, and the above-mentioned mask ROM or PROM may be used. Additionally, the EPROM 37 may be replaced by a flash memory or the like.

The RAM 38 is an accumulation part in/from which a program for executing each process in the present embodiment is written/read. The RAM 38 stores various kinds of data, such as viewing audience history of contents programs viewed by the TV 13 or a change in channel. As the RAM 38, an SRAM or a DRAM may be used, but not limited to in the present embodiment.

The display part 39 displays the channel number of the broadcast program output to the TV 13, contents of a program, display of a list of contents name, various kinds of message, etc.

Figure 4:
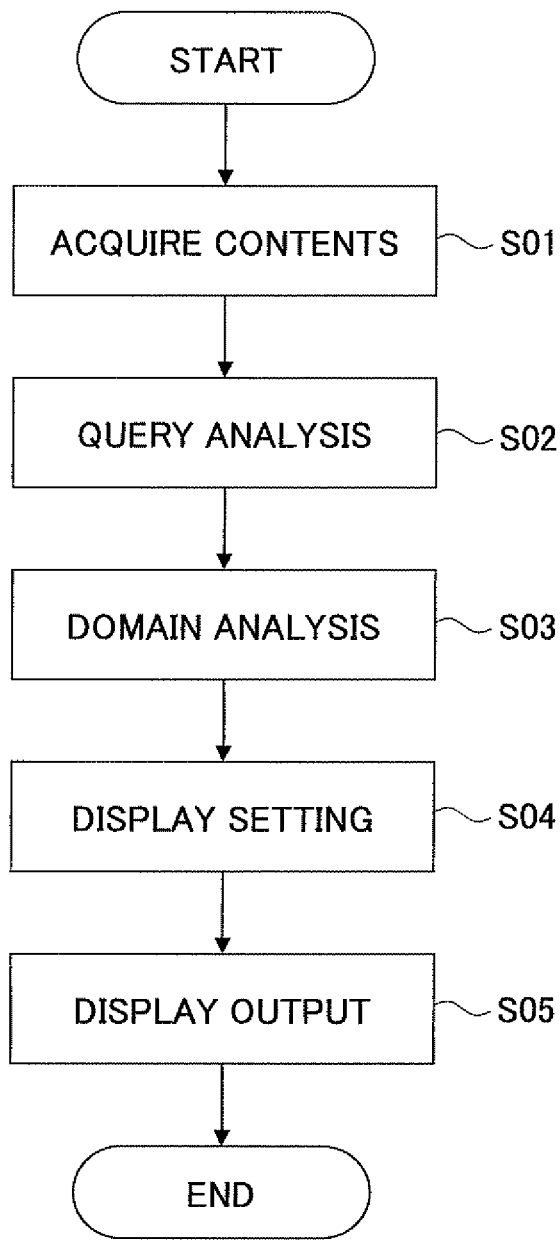
FIG. 4 is a flowchart of a display screen changeover process.

A description is given of a display screen changeover process in the present embodiment. FIG. 4 is a flowchart of a display screen changeover process in the present embodiment.

In the display screen changeover process illustrated in FIG. 4, the STB 12 acquires contents (S01) and analyzes the acquired contents. Specifically, the STB 12 checks address information, such as URL (Uniform Resource Locator) related to each HTML contents, and analyzes whether a predetermined character string or value exists in a query added to the address information such as URL (S02). In the process of S03, an analysis is made as to whether the domain contained in the address information is the set-up domain by referring to the address information such as URL assigned to each HTML contents as mentioned above.

Then, a display screen setting is performed (S04) based on the result of analysis obtained in the process S02 and S03. Then, the set contents are output to the TV 13 to cause the set contents to be output on a screen (S05).

Thereby, according to the present embodiment, a changeover of a display by a TV screen can be quickly and easily performed using only address information without analyzing source code of HTML contents.

Here, a description is given of an example of basic information used when performing the contents analysis and the display screen setting in the present embodiment.

FIGS. 5A-5C are illustrations indicating examples of each basic information item used in the present embodiment. FIG. 5A illustrates an example of analysis basic information when performing a query interpretation. FIG. 5B illustrates analysis basic information used when performing a domain interpretation. FIG. 5C illustrates an example of an HD reduction magnification which is display basic information.

As basic information at the time of query interpretation illustrated in FIG. 5A, an SD display setting and an HD display setting are indicated as conditions for changing the display screen. Specifically, when performing the SD display setup, one of a plurality of character strings contained in a query part contained in URL information of the HTML contents are set. For example, as illustrated in FIG. 5A, when the SD display is performed with respect to the contents, "SD=1" is set and when the HD display is performed, "SD=0" or "HD=1" is set as basic information.

Therefore, in the present embodiment, it is judged in the query analysis by the contents analysis part 24 mentioned above whether the character strings "SD=1", "SD=0", "HD=1" are contained in the query part contained in URL by referring to URL of contents of HTML. Additionally, by making that a plurality of conditions can be set, if, for example, the query of HD=1 is used for other conditions, "SD=0" can be used. Thereby, general versatility is given in setting of query, and the present embodiment is applicable extensively.

In the present embodiment, when none of the conditions is met in the query analysis using the basic information illustrated in FIG. 5A, for example, a reduced size (reduction of HD size) display for countermeasures for TV over-scan can be performed in the above-mentioned display setting part 25.

As illustrated in FIG. 5B, by previously setting a domain, if the domain is contained in URL, a setting according to the previously set display condition (for example, an SD display) can be made. It should be noted that if the URL of the HTML contents to be displayed does not contain the domain described in FIG. 5B, an HD display can be used. Additionally, the SD display and the HD display may be set respectively. In such a case, if it does not match the domain of each of SD and HD, the setting can be changed to the HD reduction display.

As illustrated in FIG. 5C, by setting an arbitrary reduction magnification, a display can be made by reducing by the reduction magnification set for the input contents (for example, 90% in the example of FIG. 5C). It is desirable to set the reduction magnification to, for example, about 75% to 95%, but it is not limited to such a reduction magnification in the present embodiment.

That is, in the present embodiment, based on the above-mentioned basic information, the SD display is applied if the query of "SD=1" is given to the URL and contents in the site registered as a domain to perform the SD display, the HD display is applied if the query of "SD=0" is given to URL, and the reduction HD display is applied if the domain other than the SD display domain and the query of "SD=*" does not exist.

In addition, in the present embodiment, the contents to be changed based on the result of the query analysis or the domain analysis with respect to the address information such as URL are not limited to the above-mentioned contents. For example, by directly inputting a screen size (pixel) or a resolution (for example, 960×540, 720×480, 640×480), etc., in a query, a more detailed output setting can be made to the TV.

A description is given of a specific example of the contents interpretation method in the present embodiment. FIGS. 6A-6C are illustrations indicating examples of address information to be subjected to the contents interpretation process.

FIG. 6A is an illustration for explaining a query interpretation method, FIG. 6B is an illustration for explaining a domain interpretation method, and FIG. 6C is an illustration for explaining a contents interpretation combining the query interpretation method and the domain interpretation method.

In the examples of FIGS. 6A-6C, if address information is "http://www.test.com/index.html?stbid=12345&SD=0", for example, "www.test.com" is a domain description portion and "stbid=12345&SD=0" is a query description portion. That is, a portion subsequent to a predetermined character sequence "?" is a query description portion.

Especially regarding the predetermined character sequence "?" which divides two description portions as mentioned above, the predetermined character sequence is not limited to "?". Because the order of the notation of the URL notation is defined in RFC (Request for Comments), a description order cannot be changed arbitrarily. Moreover, with respect to a query description portion, there is no limitation to the notation order of queries because a plurality of queries can be arranged with "&".

Moreover, the above-mentioned address information can be acquired by displaying a Web page of a specific search site or acquired from URL assigned to a plurality of sites obtained by a search performed on, for example, a Web server by using a search keyword input by a user through the search site. It should be noted that acquisition of address information is not limited to this, and, for example, a method which can acquire URL of contents by a method such as downloading may be used.

As illustrated in the example of FIG. 6A, when distinguishing the display setting information in the query description portion, the SD display is applied if the query character "SD=1" is under URL, and the HD display is applied if the query character "SD=0" is under URL. If there is no query character such as "SD=0" and "SD=1", the reduction HD display is applied.

Specifically, if the query "SD=1" is given to URL, the SD display is applied. If the query "SD=0" is given to URL, the HD display is applied. In the present embodiment, even when a plurality of queries are described and if one of the above-mentioned query characters is present in the plurality of queries, a display according the one of the query characters is applied.

For example, if there is no query beginning by "SD=", it is determined as contents of a general site, and the HD reduction display is applied. If a query completely matches "SD=0" or "SD=1", a determination of display is made.

Moreover, as illustrated in FIG. 6B, when judging the display setting information by the domain description portion, the domain to which the SD display is applied is registered previously, and the SD display is performed when displaying URL defined in the domain concerned.

Specifically, when "http://www.testtest.com" and "http://www.test-sd.com/index.html" are set up as conditions for the SD display, URL of the HTML contents to be displayed is referred to. If the URL concerned includes the above-mentioned domain, the SD display is applied, and in other cases, a control is performed to apply, for example, the HD reduction display. It is not necessary to carry out a display changeover setup to a query for each HTML contents on the contents provider side, and contents display can be managed collectively.

In the present embodiment, the contents interpretation may be performed using both the query analysis. In such a case, a top priority is given to the query name distinction, and the domain name distinction is performed after the query analysis. That is, even if it is a page of a domain to which the SD display is applied, a priority is given to a query so that the HD display is applied.

For example, when "www.test-sd.com" is registered as a domain to which the SD display is applied, as illustrated in FIG. 6C, the HD display is applied by giving "SD=0" query even if the contents are in a domain to which the SD display is applied. On the other hand, if it is not the domain to which the SD display is applied, and there is no query matching "SD=0" and "SD=1", the reduction HD display is applied.

Thus, by setting up as mentioned above, contents can be displayed on a screen in a suitable state according to the address information of the contents.

In the present embodiment, the display contents of SDTV and HDTV may be displayed as a parameter in a source code of an HTML page. The description in the HTML page can be achieved by, for example, providing an exclusive tag to notify aspect information in a <header> tag or a <body> tag, or using a method of describing as an exclusive script. It should be noted that the information to describe is not limited to the aspect information, and, for example, using info/notion regarding a resolution of HTML may provide the same effect.

However, in describing in an HTML page, all the contents of a source code must be analyzed by the receiver apparatus side of the STB side, which requires a complicated analysis. Therefore, in order to change the contents display on TV screen quickly and easily, it is desirable to perform the query analysis and the domain analysis as mentioned above.

Figure 7C:
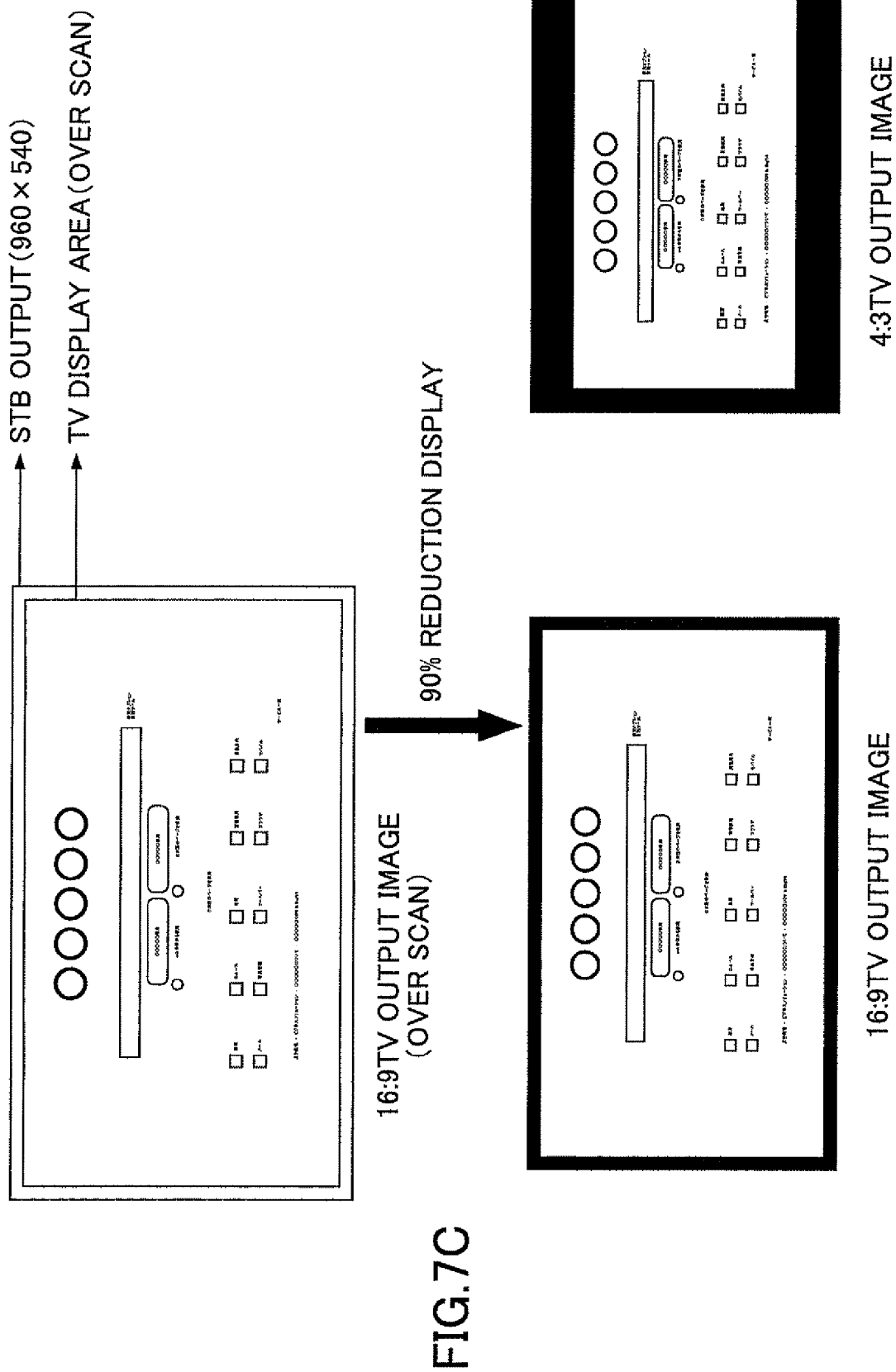

A description is given of an example of display on a TV screen in the present embodiment. FIGS. 7A-7C are illustrations indicating examples of display on a TV screen in the present embodiment. FIG. 7A illustrates an example of the SD (standard image quality) display, FIG. 7B illustrates an example of the HD (high definition) display, and FIG. 7C illustrates an example of a reduction HD display.

FIG. 7A illustrates a mode to display portal contents of an SD size by the contents analysis mentioned above. In this case, an output image to a TV of which aspect ratio is 16:9 is displayed by setting a browser display area thereof to 720×480 (4:3). According to the example illustrated in FIG. 7A, the browser area is set larger than a regular browser area, and, thereby, the contents can be displayed with an appropriate size which the user can easily viewed by efficiently using a display area of a screen.

FIG. 7B illustrates a mode to display portal contents of an HD size by the contents analysis mentioned above. In this case, an output image to a TV of which aspect ratio is 16:9 is displayed by setting a browser display area thereof to 960×540 (16:9).

FIG. 7C illustrates a mode to display contents of an HD size by reducing to 90% by the contents analysis mentioned above. In this case, a display can be performed with a browser area set to 960×540 (16:9). Because the end of contents may be located outside the display area when displayed by a TV which performs over-scan, the entire contents are displayed by being reduced by a predetermined magnification (90% in the example of FIG. 7C) as illustrated in FIG. 7C in the present embodiment.

In the case of the example illustrated in FIG. 7C, generally, the HTML contents are not provided with a safety zone supposing TV display, and, thus, a display cutoff may be generated when an over-scan display is performed on the TV side. As countermeasures for such a problem, the reduction display is performed in the present embodiment to prevent the display cutoff.

Here, the above-mentioned display screen changeover apparatus can realize the above-mentioned display screen changeover by executing a program (display screen changeover program) which causes a computer to perform each function mentioned above. The display screen changeover program is installed, for example, in the STB 12 mentioned above.

The CPU 34 illustrated in FIG. 3 (the control part 28 illustrated in FIG. 2) reads the display screen changeover program written in the EPROM 37 illustrated in FIG. 3 (the accumulation part 23 illustrated in FIG. 2), and executes the read display screen changeover program. The display screen changeover program may be distributed by being stored in a recording medium, such as a magnetic disk (a flexible disk, a hard disk, etc.), an optical disc (a CD-ROM, a DVD, etc.), and a semiconductor memory, etc. Alternatively, the display screen change program may be downloaded from a predetermined server.

As mentioned above, according to the present embodiment, the contents display on the TV screen can be changed quickly and easily. That is, according to the present embodiment, a user, such as a TV viewing audience, does not need to directly set up the display contents, and can cause the TV screen to output an optimal display result automatically. Moreover, according to the present embodiment, the contents provider side can set up the screen which is desired to be displayed to the viewing audience.

Furthermore, according to the present embodiment, for example, a size of an HTML page to be displayed can be known by embedding the aspect ratio information as a query in link URL of an HTML page or previously registering a domain to be SD displayed (or HD displayed) on the reception terminal side, and the display can be changed to a display suitable for the page concerned. Thereby, a display area of a TV can be used efficiently to provide a best display can be provided to viewing audience.

Moreover, according to the present embodiment, even if the service is continued from the time where a 4:3 TV is a mainstream size, an HTML page of an SD size, which has been used, can be applied without change. Moreover, it becomes easy to add an HTML page service of an HD size. Moreover, because the aspect information is embedded in a query of link URL, a discrimination of an HD size and an SD size can be made by not changing the HTML page itself but operating by the application side of the HTML server. Moreover, it is not necessary to provide an API (Application Programming Interface) of analyzing a source code of an HTML page because the aspect information is embedded in a query of link URL, and a display size can be changed on the reception side by merely notifying URL itself.

The present invention is not limited to the specifically disclosed embodiments, and variations and modifications may be made without departing from the scope of the present invention.

The present application is based on Japanese priority application No. 2010-224402 filed on Oct. 1, 2010, the entire contents of which are hereby incorporated herein by reference.

What is claimed is:

1. A display screen changeover apparatus changing a screen display when displaying HTML contents on a display screen of a television receiver, comprising:
   a contents analysis part configured to analyze a query description portion included in a URL (Uniform Resource Locator), that is assigned to one or more Web pages, contained in said HTML contents and acquire display setting information with respect to said television receiver from the one or more Web pages corresponding to the URL contained in said HTML contents;
   a display setting part configured to set a display of said HTML contents with respect to said display screen based on a result of analysis obtained by said contents analysis part; and
   an output part including a display screen and configured to display the HTML contents on the display screen,
   wherein the URL includes a domain description portion and the query description portion that follows the domain description portion with a predetermined character sequence provided between the domain description portion and the query description portion,
   wherein in a case where the contents analysis part determines that a predetermined character string is included in the query description portion and the domain description portion includes a set-up domain, the output part is configured to perform changeover of the screen display in accordance with the predetermined character string and setting of the set-up domain, and
   wherein the predetermined character string included in the query description portion contains information pertaining to at least one of screen size and resolution of the HTML contents.

2. The display screen changeover apparatus as claimed in claim 1, wherein said contents analysis part analyzes said display setting information using the query description and/or the domain description portion contained in said URL.

3. The display screen changeover apparatus as claimed in claim 2, wherein, when said display setting information exists in both said query description portion and said domain description portion according to the result of analysis obtained by said contents analysis part, said display setting part sets the display by giving priority to the display setting information obtained from said query description portion.

4. The display screen changeover apparatus as claimed in claim 1, wherein said display screen changeover apparatus is a set top box (STB).

5. The display screen changeover apparatus as claimed in claim 1, wherein said display screen changeover apparatus is incorporated in said television receiver.

6. A display screen changeover method of changing a screen display when displaying HTML contents on a display screen of a television receiver, comprising:
   a contents analysis step of analyzing a query description portion included in a URL (Uniform Resource Locator), that is assigned to one or more Web pages, contained in said HTML contents and acquiring display setting information with respect to said television receiver from the one or more Web pages corresponding to the URL contained in said HTML contents;
   a display setting step of setting a display of said HTML contents with respect to said display screen based on a result of analysis obtained by said contents analysis step, and
   a display step of displaying the HTML contents on the display screen,
   wherein the URL includes a domain description portion and the query description portion that follows the domain description portion with a predetermined character sequence provided between the domain description portion and the query description portion,
   wherein in a case where a predetermined character string is determined to be included in the query description portion in the contents analysis step, a changeover of the screen display is performed in accordance with the predetermined character string in the display step, and
   wherein the predetermined character string included in the query description portion contains information pertaining to at least one of screen size and resolution of the HTML contents.

7. The display screen changeover method as claimed in claim 6, wherein said contents analysis step analyzes said display setting information using the query description and/or the domain description portion contained in said URL.

8. The display screen changeover method as claimed in claim 7, wherein, when said display setting information exists in both said query description portion and said domain description portion according to the result of analysis obtained by said contents analysis part, said display setting step sets the display by giving priority to the display setting information obtained from said query description portion.

9. A non-transitory computer readable recording medium storing a program causing a computer to perform the display screen changeover method as claimed in claim 6.

* * * * *